US006567346B2

(12) United States Patent
Aton et al.

(10) Patent No.: US 6,567,346 B2
(45) Date of Patent: May 20, 2003

(54) ABSOLUTE TIME SCALE CLOCK

(75) Inventors: Thomas J. Aton, Dallas, TX (US); Shivaling S. Mahant-Shetti, Manipal (IN)

(73) Assignee: Texas Instruments Incorporated, Dallas, TX (US)

( * ) Notice: Subject to any disclaimer, the term of this patent is extended or adjusted under 35 U.S.C. 154(b) by 326 days.

(21) Appl. No.: 09/757,074

(22) Filed: Jan. 8, 2001

(65) Prior Publication Data

US 2002/0126583 A1 Sep. 12, 2002

Related U.S. Application Data

(60) Provisional application No. 60/175,041, filed on Jan. 7, 2000.

(51) Int. Cl.[7] .......................... G04C 15/00; G04F 5/00; H01J 47/02; G01J 1/42

(52) U.S. Cl. ...................... 368/155; 368/156; 250/384; 250/393

(58) Field of Search ................................ 368/155, 156, 368/204, 205; 250/359.1, 363.01, 370.01, 384, 393

(56) References Cited

U.S. PATENT DOCUMENTS

| | | | | | |
|---|---|---|---|---|---|
| 3,629,582 | A | * | 12/1971 | Koehler et al. | 250/71.5 |
| 3,724,201 | A | * | 4/1973 | Bergey | 58/50 R |
| 4,275,405 | A | * | 6/1981 | Shannon | 357/23 |
| 4,676,661 | A | * | 6/1987 | Keenan et al. | 368/156 |

* cited by examiner

*Primary Examiner*—Vit Miska
(74) *Attorney, Agent, or Firm*—Carlton H. Hoel; W. James Brady; Frederick J. Telecky, Jr.

(57) ABSTRACT

An absolute time scale clock includes a radioactive isotope and a computer. The computer includes a processor that determines an indication of the current absolute time and a memory that stores a decay constant of the radioactive isotope, a reference time, and an amount of the isotope at the reference time. A energy supply that provides power to the computer. The absolute time scale clock further includes a detector positioned to respond to emissions from the radioactive isotope. The detector generates an indication of the number of emissions over a time interval that varies with the decay rate of the isotope. The processor is responsive to the indication from the detector, the decay constant, the reference time, and the reference amount to determine the indication of current absolute time.

27 Claims, 3 Drawing Sheets

*FIG. 1*
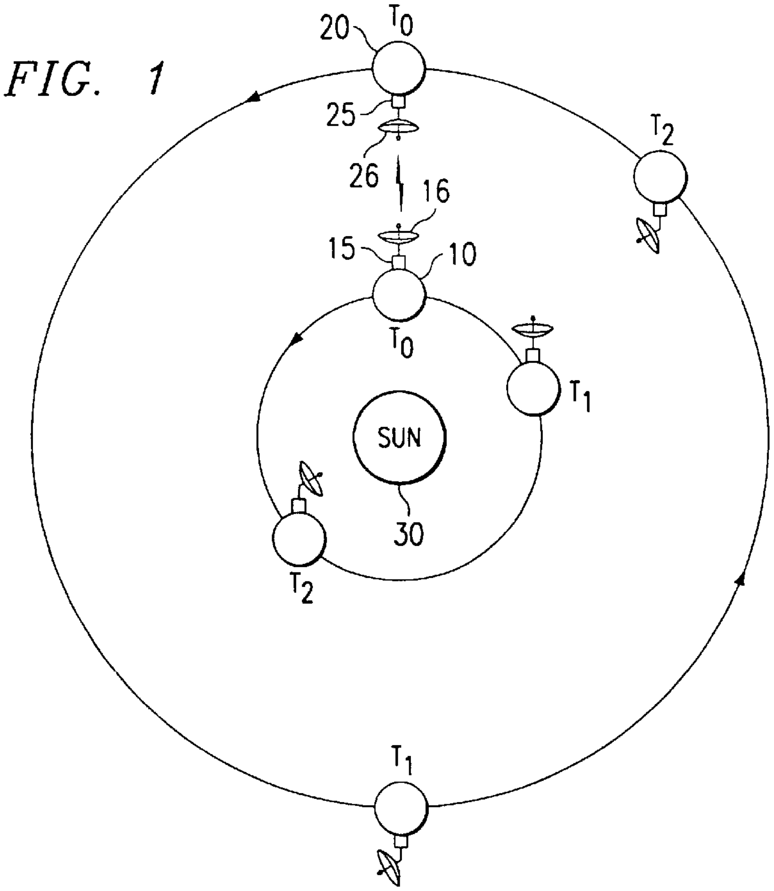
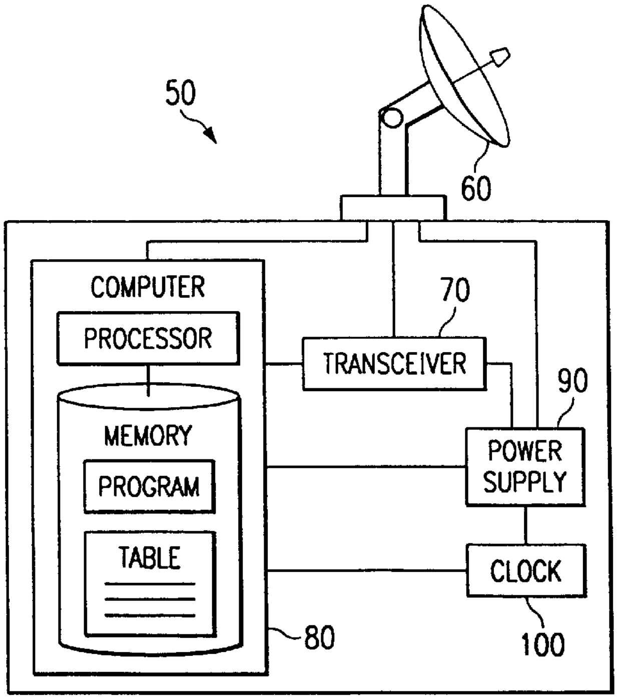
*FIG. 2*

ABSOLUTE TIME SCALE CLOCK

This application claims the benefit of provisional application Ser. No. 60/175,041, filed Jan. 7, 2000.

TECHNICAL FIELD OF THE INVENTION

This invention relates to time determination and, in particular, to an apparatus and method for determining an indication of the current absolute time after an undetermined period of time in which accurate timekeeping is not possible.

BACKGROUND OF THE INVENTION

Communication systems that are remote from each other frequently use antennas to exchange communications. Many of these antennas are designed to have narrow beamwidths so that sufficient power can be transmitted to other communication systems. Thus, properly aligning the antennas for remotely located communication systems is important so that the communication systems can continue to exchange communications. Maintaining this alignment, however, is difficult if the communication systems move relative to each other, which often occurs in space applications, unless each communication system can determine the relative position of the other communication system.

Fortunately, such determinations are readily known to those skilled in the art for space applications because the movement of objects, such as satellites and planets, in space is well understood. Of course, determining the current position of a communication system depends on first determining what is the current absolute time. For instance, if a communication system cannot determine what is the current absolute time, it would not be able to determine its position and, accordingly, how to orient the system antenna.

During most operations, however, it is relatively easy for a communication system to determine the current absolute time. For example, during periods in which a first communication system is in contact with a second communication system, the second communication system receives updates from the first communication system as to the current absolute time. Also, the second communication system may possess a relative time scale clock that allows a determination of elapsed time while out of contact with the first communication system.

A problem arises, however, when the communication systems are not in contact and there are undetermined periods of time when the communication system clock does not function properly. This occurs, for example, during a Martian winter, when it can be impossible to sustain clock operations due to extremely cold temperatures. Of course, when the temperature rises, the system clock becomes functional and communication is again possible, but only if the position of the communication system can be determined for reestablishing antenna orientation by means of a clock that can compute absolute time.

Hence, a clock that can be reset following a power outage or extreme environmental conditions would be highly desirable.

SUMMARY OF THE INVENTION

The present invention reduces or eliminates at least some of the problems and disadvantages associated with previous clocks. The present invention provides an apparatus and method for determining an indication of the current absolute time after an undetermined period of time in which accurate timekeeping is not possible.

In certain embodiments, the present invention provides an absolute time scale clock. The clock includes a radioactive isotope and a computer, which includes a processor and a memory. The processor can determine an indication of the current absolute time, and the memory can store a decay constant of the isotope, a reference time, and an amount of the isotope at the reference time. The clock also includes a supply of energy for supplying power to the computer. The clock further includes a detector positioned to respond to radioactive emissions from the isotope by generating an indication of the number of emissions over a time interval, the indication varying with said decay rate of said isotope. The processor, when supplied with sufficient power by the energy supply, is responsive to the indication from the detector, the decay constant, the reference time, and the reference amount to determine the indication of the current absolute time.

In other embodiments, the present invention provides a method for determining an indication of absolute time after an undetermined period time in which accurate timekeeping is not possible. The method begins with storing in a computer, before an undetermined period of time in which accurate timekeeping is not possible, a decay constant for a radioactive isotope, a reference time, and an amount of the isotope at the reference time. The method then calls for detecting an indication of loss of accurate timekeeping. After this, the method requires detecting an indication of the availability of accurate timekeeping after the undetermined period of time. Next, the method requires determining, after said undetermined period of time, the current decay rate of the radioactive isotope. Finally, the method calls for determining an indication of the current absolute time based on the current decay rate, the decay constant, the reference time, and the reference amount.

The present invention can provide a variety of technical features and advantages. For example, because the present invention can determine an indication of the current absolute time after an undetermined period of time during which accurate timekeeping is not possible, the invention is useful for determining time in environments where electrical activity is insufficient to support accurate timekeeping for an undetermined period of time. Moreover, the invention is useful for determining time in environments where electrical energy is insufficient to support accurate timekeeping for an undetermined period of time. Thus, time sensitive equipment operating in these types of environments can still function properly.

Other technical features and advantages will be readily apparent to those of skill in the art from the following figures, description, and claims.

BRIEF DESCRIPTION OF THE DRAWINGS

For a more complete understanding of the present invention, and for further features and advantages, reference is now made to the following description taken in conjunction with the accompanying drawings, where like reference numerals represent like parts, in which:

FIG. 1 illustrates a first communication system that moves relative to a second communication system;

FIG. 2 illustrates an embodiment of a communication system that uses a clock for determining an indication of the current absolute time after an undetermined period of time in which accurate timekeeping is not possible;

DETAILED DESCRIPTION OF THE INVENTION

Figure 3:
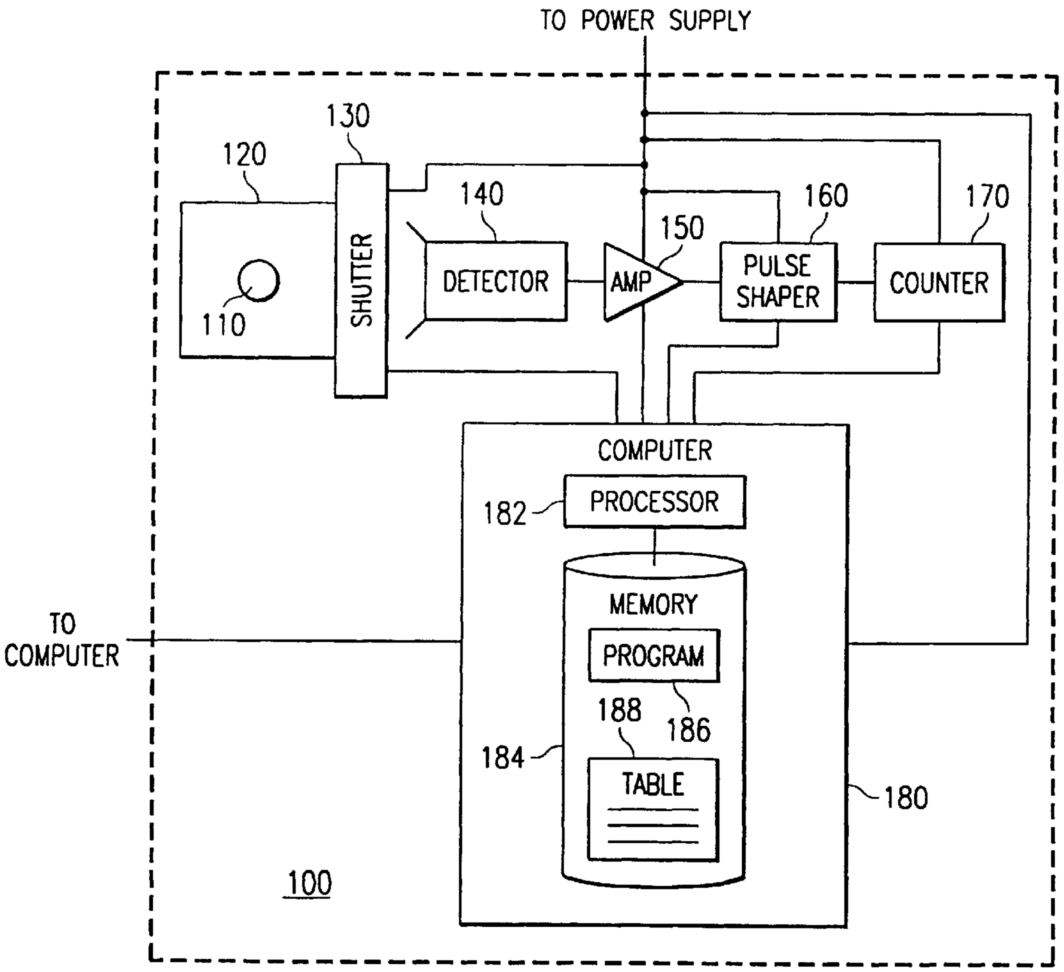
FIG. 3 illustrates an embodiment of a clock in accordance with the present invention.

Referring to FIG. 1, communication systems that move relative to each other are frequently encountered in space applications, where alignment problems are especially critical because at times a communication system in space cannot be easily adjusted. For example, FIG. 1 illustrates a communication system 15 on a planet 10, such as Earth, and a communication system 25 on a planet 20, such as Mars. At time $T_0$, an antenna 16 of communication system 15 can be aligned with an antenna 26 of communication system 25, making communication possible. At time $T_1$, however, planet 10 and planet 20 have moved relative to each other in their orbits around the sun 30. Communication between communication system 15 and communication system 25 is not possible now because communication system 25 is on the opposite side of planet 20 from communication system 15. At time $T_2$, however, communication is again possible, but, of course, only if communication system 25 can determine how to orient antenna 26, which requires knowing the absolute time so that the location of the communication system 15 relative to the communication system 25 can be determined.

FIG. 2 illustrates an embodiment of a communication system 50 that uses a clock 100 for determining an indication of the current absolute time after an undetermined period of time in which accurate timekeeping is not possible. Using this indication, communication system 50 can establish communications with a remote receiver, such as communication system 15, after an undetermined period of time. Communication system 50 includes an antenna 60 coupled to a transceiver 70, a computer 80, and a power supply 90. Transceiver 70 is also coupled to the computer 80 and the power supply 90. In addition, computer 80 is coupled to power supply 90 and the clock 100. Further, clock 100 is coupled to power supply 90.

Computer 80 is responsible for controlling the orientation of antenna 60. To correctly orient the antenna 60, computer 80, utilizing an internal clock, computes the position of the remote receiver relative to antenna 60 and generates commands to orient the antenna 60 in the direction of the remote receiver. To compute the relative location of the remote receiver, however, computer 80 must have an indication of the current absolute time.

During typical operations, computer 80 can receive absolute time updates from the remote receiver and/or internally keep track of the current absolute time using the internal clock, which uses a relative time scale. If, however, there is an undetermined period of time in which accurate timekeeping is not possible by the internal clock and communication system 50 is not in contact with the remote receiver, then computer 80 may not be able to establish communications with the remote receiver because it may not be able to properly orient antenna 60. An undetermined period of time in which accurate timekeeping is not possible can occur for a variety of reasons, such as, for example, a failure of power supply 90 to supply a sufficient amount of power to the electrical components of communication system 50 or extreme environmental conditions in which electrical activity of the electrical components of communication system 50 is inhibited.

Clock 100, however, can supply an indication of the current absolute time to computer 80 even after an undetermined period of time in which accurate timekeeping is not possible. Using the indication of current absolute time from clock 100, the computer 80 can reset its internal clock and thereby determine the current position of the remote receiver relative to antenna 60 and correctly orient the antenna.

Antenna 60, transceiver 70, and computer 80 may include any of a variety of components well known to those of skill in the art. In addition, power supply 90 may be any of a variety of power supplies. In particular embodiments, power supply 90 may be any of a variety of well known electromagnetic radiation powered power supplies, such as, for example, a solar powered power supply. In other embodiments, power supply 90 may be any of a variety of well known battery powered power supplies. Other types of power supplies known to those of skill in the art could also be used as power supply 90.

Referring to FIG. 3, there is illustrated an embodiment of clock 100 in accordance with the present invention. In general, clock 100 includes a radioactive isotope 110, a detector 140, and a computer 180. The computer 180 stores the decay constant of the radioactive isotope 110, a reference time, and an amount of the radioactive isotope 110 at the reference time. Then, at a later time, such as when power supply 90 again supplies sufficient power, the computer 180 functions to determine an indication of the current absolute time based on the current emissions received by detector 140 from the radioactive isotope 110.

To determine the indication of the current absolute time, computer 180 utilizes the fact that radioactive materials decay over time at a known rate. The amount of radioactive isotope remaining after a period of time is determined by the equation:

$$N=N_oe^{-\lambda(t-to)}$$

where:

N= the amount of radioactive isotope at time "t,"

$N_o$=the amount of radioactive isotope at time "$t_o$,"

e=2.71828 . . . , the well know Naperian base $\lambda$=the decay constant of the radioactive isotope, t=the current time, and $t_o$=the reference time.

Thus, a radioactive isotope, such as isotope 110, undergoes an exponential decay. This decay is extremely insensitive to all extreme temperature and pressure environments that the electronics of clock 100 can physically survive. Moreover, the decay constant "$\lambda$" is well known for a variety of radioactive isotopes. Accordingly, if the amount of radioactive isotope 110 "No" is known at a reference time "to", the current absolute time "t" can be determined by determining the amount of radioactive isotope "N" currently remaining.

However, determining the amount of isotope "N" at time "t" can be a difficult task. Fortunately, radioactive isotopes generate emissions as they decay, such as, for example, alpha particles, which are the nucleii of helium atoms, beta particles, which are electrons, or gamma particles, which are photons, and these emissions can be detected. Detecting the current emissions from a radioactive isotope over a period of time leads to a determination of the current absolute time by using the derivative of the amount of radioactive isotope "N" with respect to the current time "t":

$$\frac{dN}{dt} = -\lambda N_o e^{-\lambda(t-to)}$$

Thus, by counting the number of emissions from a radioactive isotope over a period of time, the current decay rate "dN/dt" can be determined, leaving the current time "t" as the only unknown.

The selection of a particular radioactive isotope to use as isotope 110 depends on the particular mission anticipated for clock 100 because the radioactive decay rate of different radioactive isotopes varies substantially. For instance, the half-life, which is the amount of time after which one-half of the radioactive material has decayed, of Polonium 210 is 138.4 days, Thorium 228 is 1.913 years, Californium 252 is 2.65 years, Tritium is 12.26 years, and Americium 241 is 458 years. For greatest accuracy in determining the absolute time, the half-life would normally be chosen to approximately correspond to any anticipated periods during which accurate timekeeping would not be possible. For example, where the communication system 50 is to be used on the planet Mars, Polonium 210, Thorium 228, or Californium 252 would be a good choice for radioactive isotope 110 because each would exhibit a substantial decay over the course of the Martian winter. Other radioactive isotopes could be selected for situations that have shorter or longer time periods of unknown inactivity.

The amount of radioactive isotope 110 necessary would be determined based on the physical arrangement, the efficiencies of the counter and the detector, the number of half-lives over which the absolute time must be determined, and the speed and accuracy with which the absolute time must be determined. Smaller amounts of material will slow the determination since the accuracy depends on the number of emissions counted in a given time interval, which produces "dN/dt." The accuracy criteria may vary with application. One Curie of radioactive isotope undergoes $3.7 \bullet 10^{10}$ decays per second. A determination of "dN/dt" to within one-tenth of one percent requires about one-million counts, $1/0.001^2$. Thus, to achieve this accuracy within one-second, only $10^6/3.7 \bullet 10^{10}$, approximately $0.25 \bullet 10^{-4}$, Curies of material is required, assuming one-hundred percent detector and counter efficiency. Longer or shorter counting times, different detector and counter efficiencies, and different required accuracies will require different choices of isotope amounts.

Referring again to FIG. 3, the clock 100 includes a protective shield 120 around radioactive isotope 110 and a shutter 130 located between radioactive isotope 110 and detector 140. In particular embodiments of the clock 100, the radioactive isotope 110 is deposited on a plate, composed of steel, iron, lead, or any other metal. Protective shield 120 and shutter 130 shield the electrical components of the clock 100 from the emissions of radioactive isotope 110, which could degrade the performance of the electrical components. Shutter 130, however, is mounted to be positioned to allow emissions of radioactive isotope 110 to be exposed to the detector 140 when a time determination is required. Clock 100 also includes an amplifier 150 coupled to the detector 140. The output of the amplifier 150 is applied to a pulse shaper 160, having an output connected to a counter 170. The shutter 130, amplifier 150, pulse shaper 160, and counter 170 are all coupled to computer 180, which includes a processor 182 connected to a memory 184. In addition, the shutter 130, amplifier 150, pulse shaper 160, counter 170, and computer 180 are all tied to the power supply 90. Thus, when power supply 90 is not supplying electrical power to communication system 50, it also is not supplying electrical power to the clock 100. Further, computer 180 is coupled to computer 80. Other arrangements of the detector electronics may be readily chosen by those of skill in the art.

In operation, when computer 80 requires an indication of the current absolute time, which could be after a restoration of sufficient power from the power supply 90, a command is sent from the computer 80 to computer 180 to determine an indication of the current absolute time. Processor 182 then sends a command to activate amplifier 150, pulse shaper 160, and counter 170. Once these are activated, computer 180 sends a command to open shutter 130. When shutter 130 is open, the detector 140 is exposed to emissions of radioactive isotope 110. Detector 140 then receives emissions from radioactive isotope 110 for conversion into electrical signals. The electrical signals are then sent to amplifier 150 and, after amplification, are applied to pulse shaper 160. Pulse shaper 160 performs a pulse shaping function before transmitting to the counter 170. Computer 180 responds to the output of the counter 170 at pre-determined time intervals. Using the number of counts in a pre-determined time interval, processor 182 determines the current decay rate of isotope 110. After determining the current decay rate, processor 182, using a program 186, computes an indication of the current absolute time based on the current decay rate and the decay constant of radioactive isotope 110, the reference time, and the reference amount of radioactive isotope 110, which were previously stored in a table 188 in memory 184. The current absolute time computed by the computer 180 is then sent to computer 80.

After determining the indication of the current absolute time, computer 180 then sends a command to close shutter 130 and deactivate amplifier 150, pulse shaper 160, and counter 170. Closing shutter 130 causes the shutter to again shield detector 140 from the emissions of radioactive isotope 110. Then, computer 180 waits for another command from computer 80 before making another determination of the current absolute time.

In a particular embodiment, processor 182 further determines if an error criterion has been achieved before determining the indication of the current absolute time. For instance, it is known that the amount of error in an absolute time calculation is approximately inversely proportional to the square root of the number of emissions detected from radioactive isotope 110. Thus, waiting until one million emissions have been detected from radioactive isotope 110 will allow the current absolute time to be determined within one-tenth of one percent. Other error criterions well known to those skilled in the art can also be implemented.

The components of clock 100 are selected from a variety of alternatives. For example, protective shield 120 and shutter 130 may be composed of lead, iron, a composite, or any other material that shields electrical components from the emissions of radioactive isotope 110. In addition, shutter 130 may operate by retracting from a position between radioactive isotope 110 and detector 140, by creating an internal passage between radioactive isotope 110 and detector 140, or by any other suitable manner. Detector 140 may be a P-N junction, a P-N-P junction, or any other type of device that responds to emissions from radioactive isotope 110 by generating an electrical signal. Processor 182 of computer 180 may be a complex instruction set computer (CISC), a reduced instruction set computer (RISC), or any other device that can electronically manipulate electronic information. Memory 184 can be random access memory (RAM), read-only memory (ROM), compact disc read-only memory (CD-ROM), or any other type of electromagnetic or optical volatile or non-volatile computer memory. In a particular embodiment, memory 184 is electrically erasable programmable read-only memory (EEPROM). Note, in some embodiments, computer 180 may perform all or some of the functions of amplifier 150, pulse shaper 160, and counter 170.

Figure 4:
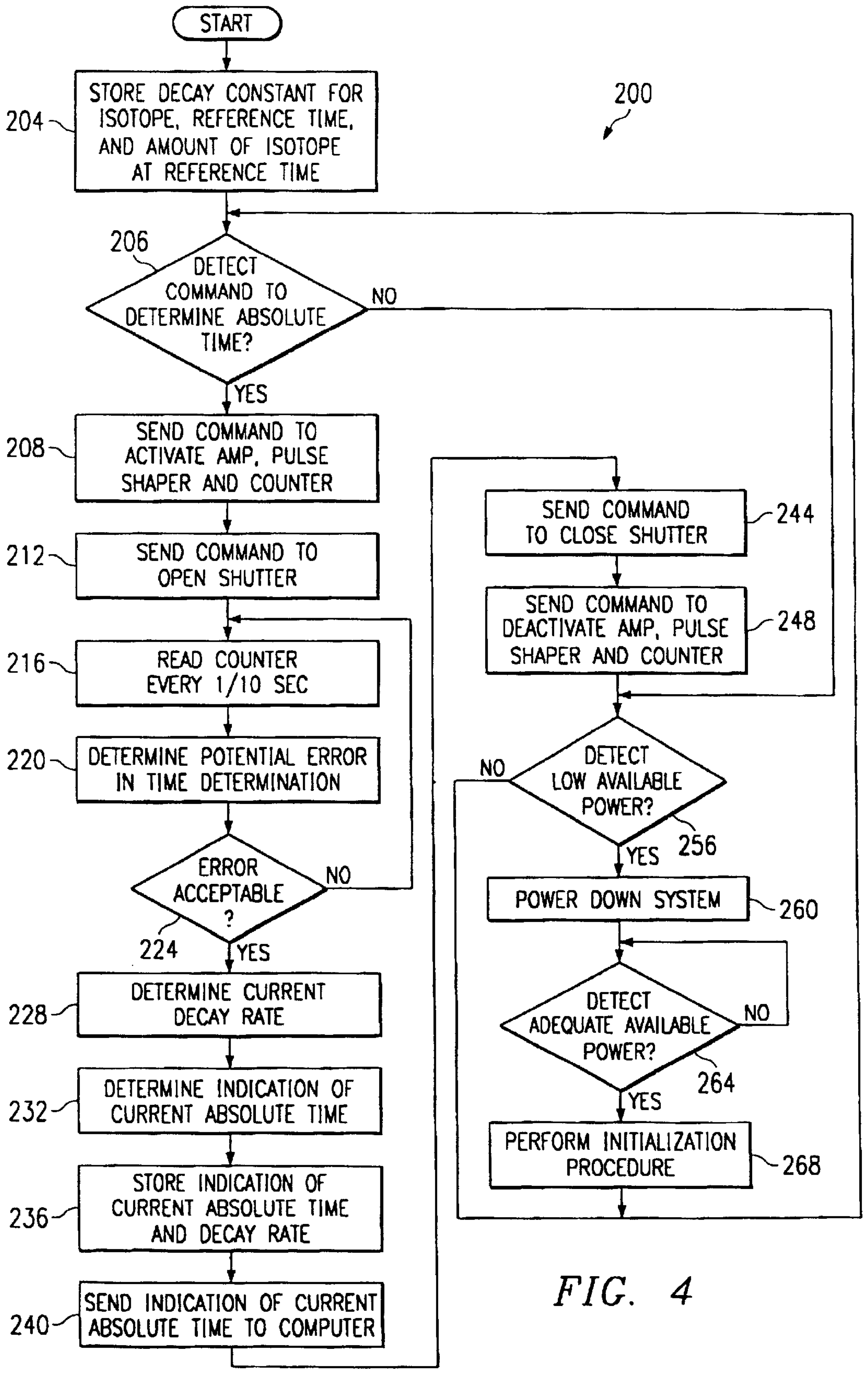
FIG. 4 illustrates an embodiment of a method for determining the indication of the current absolute time after an undetermined period of time in which accurate timekeeping is not possible.

Referring to FIG. 4, there is illustrated a flowchart 200 of an embodiment of a method for clock 100 to determine an indication of the current absolute time in the case where sufficient power becomes unavailable. During sequence 204, the decay constant for radioactive isotope 110, a reference time, and an amount of radioactive isotope 110 at the reference time are stored in memory 184. Then, during inquiry sequence 206, computer 180 determines whether it detects a command to determine an indication of the current absolute time. After detecting such a command, computer 180 sends a command at sequence 208 to activate amplifier 150, pulse shaper 160, and counter 170. Next, during sequence 212, computer 180 sends a command to open shutter 130. With shutter 130 open, detector 140 responds to the emissions of radioactive isotope 110. Next, during sequence 216, computer 180 reads the number of counts in counter 170 after one-tenth of a second. Note, the interval for reading counter 170 can be any other known counting interval. Then, during sequence 220, computer 180 determines the potential error in the absolute time determination. During inquiry sequence 224, the computer 180 determines whether the potential error is acceptable. If the potential error is not acceptable, sequences 216, 220, and 224 are repeated until enough measurements have been received to pass the error criterion.

Once computer 180 determines during inquiry sequence 224 that the error criterion has been achieved, computer 180 determines the current decay rate of radioactive isotope 110 during sequence 228, based on the number of counts over each time interval. After this, computer 180 determines an indication of the current absolute time during sequence 232 using the decay rate of the radioactive isotope 110 determined during sequence 228 and the decay constant, the reference time, and the reference amount of radioactive isotope 110 stored during sequence 204. The indication of the current absolute time and the decay rate are stored in memory 184 during sequence 236. Computer 180 sends the indication of the current absolute time to computer 80 during sequence 240. During sequence 244, a command is sent from the computer 180 to close shutter 130. A command is also sent to deactivate amplifier 150, pulse shaper 160, and counter 170 during sequence 248.

During inquiry sequence 256, the computer 180 continues to monitor whether the power available from power supply 90 is sufficient to power the clock 100. If computer 180 detects that the power available from power supply 90 is below an acceptable level during sequence 256, all the electrical components of clock 100 are powered down during sequence 260. When it is detected that adequate power is again available from power supply 90 at inquiry sequence 264, the computer 180 performs an initialization procedure during sequence 268. Computer 180 then determines whether a command has been received from computer 80 to determine an indication of the current absolute time during sequence 206.

If, however, computer 180 detects that the power available from power supply 90 is above an acceptable level during sequence 256, computer 180 also determines whether it has detected a command from computer 80 to determine an indication of the current absolute time during sequence 206. If computer 180 detects no command from computer 180, computer 180 again determines whether there is adequate available power during inquiry sequence 256. Computer 180 will cycle between inquiry sequence 206 and inquiry sequence 256 until one of the events that it is searching for is detected.

Although clock 100 has been primarily described as useful for determining an indication of the absolute time after an undetermined period of inadequate power, clock 100 could be used by computer 80 to determine an indication of the current absolute time whenever necessary, assuming sufficient power from power supply 90. In addition, although power supply 90 has been identified as a source of problems for communication system 50, other problems could prevent the communication system from functioning, such as an undetermined period of extreme cold temperature when the electronics of the communication system 50 will not function properly. Thus, clock 100 is useful in a variety of environmental conditions where adequate electronic functioning is not possible for an undetermined period of time.

Also, although clock 100 has been described as useful in communication system 50 for facilitating the determination of the position of the remote receiver relative to antenna 60 after an undetermined period of time of inadequate electrical activity, clock 100 is also useful in other systems where electrical activity is inadequate for an undetermined period of time and where it is not possible to determine the current absolute time from an outside source.

Although several embodiments the invention have been described, numerous other embodiments may readily be suggested to one skilled in the art through additions, deletions, alterations, or substitutions to the described embodiments. It is intended that the scope of the appended claims cover such additions, deletions, alterations, and substitutions.

What is claimed is:

1. An absolute time scale clock, comprising:

a radioactive isotope;

a computer comprising a processor and a said processor for determining an indication of the current absolute time, said memory for storing a decay constant of said isotope, a reference time, and an amount of said isotope at said reference time;

a supply of energy for supplying power to said computer; and a detector positioned to respond to radioactive emissions from said isotope and generating an indication of the number of emissions over a time interval, the indication varying with the decay rate of said isotope;

said processor, when supplied with sufficient power from said supply of energy, responsive to said indication from said detector, said decay constant, said reference time, and said reference amount to determine said indication of current absolute time.

2. The clock of claim 1, wherein said isotope comprises Californium 252.

3. The clock of claim 1, wherein said supply of energy comprises an electromagnetic radiation powered power supply.

4. The clock of claim 1, wherein said detector comprises a P-N junction.

5. The clock of claim 1, wherein said processor further responds to an error criterion before determining said indication of absolute time.

6. The clock of claim 1, further comprising a shutter located between said radioactive isotope and said detector for protecting said detector from said radioactive emissions of said isotope, said shutter allowing said radioactive emissions to encounter said detector during generating an indication of the number of emissions over a time interval.

7. The clock of claim 6, wherein said isotope comprises Californium 252.

8. The clock of claim 6, wherein said detector comprises a P-N junction.

9. The clock of claim 6, wherein said processor further responds to an error criterion before generating said indication of absolute time.

10. A method for determining an indication of current absolute time after an undetermined period of time in which accurate timekeeping is not possible comprising:

storing in a computer, before an undetermined period of time in which accurate timekeeping is not possible, a decay constant for a radioactive isotope, a reference time, and an amount of said isotope at said reference time;

detecting an indication of loss of accurate timekeeping;

detecting, after an undetermined period of time, an indication of the availability of accurate timekeeping;

determining the current decay rate of said radioactive isotope after said undetermined period of time; and determining in said computer an indication of the current absolute time based on said current decay rate, said decay constant, said reference time, and said reference amount.

11. The method of claim 10, wherein:

detecting an indication of loss of accurate timekeeping comprises detecting a reduction in available power to said computer; and detecting an indication of the availability of accurate timekeeping comprises detecting an increase in available power to said computer after an undetermined period of time.

12. The method of claim 10, further comprising controlling a shutter that shields said radioactive isotope to control determining said current decay rate of said isotope.

13. The method of claim 10, wherein determining said current decay rate comprises detecting and counting the number of emissions from said isotope over a time interval.

14. The method of claim 10, further comprising determining whether a sufficient number of emissions have been gathered to satisfy an error criterion.

15. The method of claim 10, wherein said isotope comprises Californium 252.

16. A method comprising:

storing, before an undetermined period of time in which accurate timekeeping is not possible, a decay constant for a radioactive isotope, a reference time, and an amount of said isotope at said reference time;

detecting an indication of loss of accurate timekeeping;

detecting, after an undetermined period of time, an indication of the availability of accurate timekeeping;

determining the current decay rate of said radioactive isotope after the undetermined period of time; and determining an indication of the current absolute time based on said current decay rate, said decay constant, said reference time, and said reference amount.

17. The method of claim 16, wherein:

detecting an indication of loss of accurate timekeeping comprises detecting a reduction in available power; and detecting an indication of the availability of accurate timekeeping comprises detecting an increase in available power.

18. The method of claim 16, further comprising controlling a shutter that shields said radioactive isotope to control determining said current decay rate of said isotope.

19. The method of claim 16, further comprising determining whether a sufficient number of emissions have been gathered to satisfy an error criterion.

20. The method of claim 16, wherein said isotope comprises Californium 252.

21. A system for establishing communications with a receiver after an undetermined period of time in which accurate timekeeping is not possible comprising:

an antenna;

an absolute time scale clock comprising:

a radioactive isotope;

a detector positioned to respond to radioactive emissions from said isotope and generating a detected emissions output; and a counter coupled to said detector and responsive to said detected emissions output from said detector to generate an indication from the number of emissions over a time interval;

a first computer coupled to said counter, said first computer comprising:

a memory for storing a decay constant of said isotope, a reference time, and an amount of said isotope at said reference time; and a processor coupled to said memory, said processor responsive to said decay constant, said reference time, said reference amount, and said indication of the number of emissions over said time interval from said counter to determine the current decay rate of said isotope and to determine an indication of the current absolute time;

a second computer coupled to said antenna and said clock, said second computer comprising:

a memory for storing motion equations of said receiver relative to said antenna; and a processor coupled to said memory, said processor responsive to said indication of said current absolute time from said first computer to determine the current position of said receiver relative to said antenna and to control the orientation of said antenna so that said antenna establishes communications with said remote receiver; and a power supply coupled to said antenna, said clock, and said second computer, said power supply having active and inactive states, said power supply supplying an insufficient level of power to maintain operations of said clock and said second computer for an undetermined period of time in said inactive state.

22. The system of claim 21, wherein said isotope comprises Californium 252.

23. The system of claim 21, wherein said detector comprises a P-N junction.

24. The system of claim 21, wherein the power supply comprises an electromagnetic radiation powered power supply.

25. The system of claim 21, wherein said processor of said first computer further responds to an error criterion before determining said indication of absolute time.

26. The system of claim 21, wherein said clock further comprises a shutter located between said isotope and said detector for protection of said detector, said shutter allowing said radioactive emissions to encounter said detector during generation of the decay rate.

27. The system of claim 21, wherein said first computer and said second computer are the same computer.

* * * * *